United States Patent [19]
Sterling

[11] Patent Number: 5,974,804
[45] Date of Patent: Nov. 2, 1999

[54] APPARATUS AND METHOD FOR CONVERTING THERMAL ENERGY TO MECHANICAL ENERGY

[76] Inventor: Jeffrey Stephen Sterling, 21251 SW. 228 St., Miami, Fla. 33170

[21] Appl. No.: 08/683,034

[22] Filed: Jul. 16, 1996

Related U.S. Application Data

[63] Continuation-in-part of application No. 08/425,992, Apr. 19, 1995, Pat. No. 5,685,152.

[51] Int. Cl.⁶ .................................................... F01K 11/00
[52] U.S. Cl. ............................................... 60/670; 60/645
[58] Field of Search ........................................ 60/645, 670

[56] References Cited

U.S. PATENT DOCUMENTS

| | | |
|---|---|---|
| 1,874,620 | 8/1932 | Radford . |
| 2,982,864 | 5/1961 | Furreboe ..................................... 290/2 |
| 4,033,141 | 7/1977 | Gustafsson ................................ 60/671 |

*Primary Examiner*—Noah P. Kamen
*Attorney, Agent, or Firm*—Jones & Askew, LLP

[57] ABSTRACT

A thermal energy conversion and storage system incorporating a motorless compressor that converts intermittent thermal energy to a low temperature thermal energy heat sink, and stores the thermal energy heat sink for use later. The low temperature heat sink can drive an ambient powered heat engine, is a low temperature source of refrigeration for cooling an enclosed space, and is an efficient energy storage device.

2 Claims, 14 Drawing Sheets

APPARATUS AND METHOD FOR CONVERTING THERMAL ENERGY TO MECHANICAL ENERGY

CROSS-REFERENCE TO RELATED APPLICATIONS

This application is a continuation-in-part of U.S. patent application Ser. No. 08/425,992, filed Apr. 19, 1995, now U.S. Pat. No. 5,685,152, issued Nov. 11, 1997, which is herein incorporated in its entirety.

TECHNICAL FIELD

The present invention relates to the conversion of thermal energy to mechanical power. More particularly, a system in which refrigerants are heated and cooled facilitates this conversion of thermal energy into mechanical energy.

BACKGROUND OF THE INVENTION

Solar energy is a prime source of thermal energy. One example of the use of thermal energy conversion into mechanical power is the steam engine. Another example of the use of thermal energy conversion into mechanical power is the steam turbine. However, on a scale comparable to the use of fossil fuels for the provision of thermal energy, the use of solar energy to produce mechanical power is almost nonexistent. Therefore, there is a need for improvement in the method and apparatus to attain mechanical power from thermal energy, and there is a need for improvement in the method and apparatus to store thermal energy.

SUMMARY OF THE INVENTION

This present invention provides a method and apparatus to convert thermal energy to mechanical energy.

Accordingly, it is an object of the present invention to provide a system of valves and heat exchangers for inclusion into an organic Rankine cycle that replaces the mechanical compressor normally used to facilitate a continual cycle. It is also an object of the present invention to provide a system that stores thermal energy as a low temperature heat sink.

It is also an object of the present invention to provide a system that uses an ambient heat source and a stored refrigerated heat sink to drive a heat engine.

It is an ancillary object of the present invention to provide a system that uses thermal energy derived from the sun to cool an enclosed space as a product of the conversion of the sun's thermal energy to a stored thermal heat sink.

Still further objects and advantages will become apparent from a consideration of the ensuing description and accompanying drawings.

BRIEF DESCRIPTION OF THE DRAWINGS

FIGS. 9 a) through 9 l) show sequentially the operation of the motorless pump in the thermal energy conversion and storage system of the present invention.

DETAILED DESCRIPTION

The present invention is a thermal energy conversion and storage system for capturing thermal energy in a refrigerant, converting thermal energy to mechanical energy, and recycling the refrigerant without the use of a mechanical compressor.

The thermal energy conversion and storage system of the present invention captures thermal energy, stores a portion of the captured thermal energy, and converts a portion of captured and stored thermal energy to mechanical energy. Additionally the present invention converts a portion of the converted thermal energy to a refrigerated thermal heat sink, stores the refrigerated thermal heat sink, cools and condenses the gaseous refrigerant exhaust from a heat engine using a portion of the refrigerated heat sink, and cools an enclosed space using a portion of the refrigerated heat sink.

Figure 3:
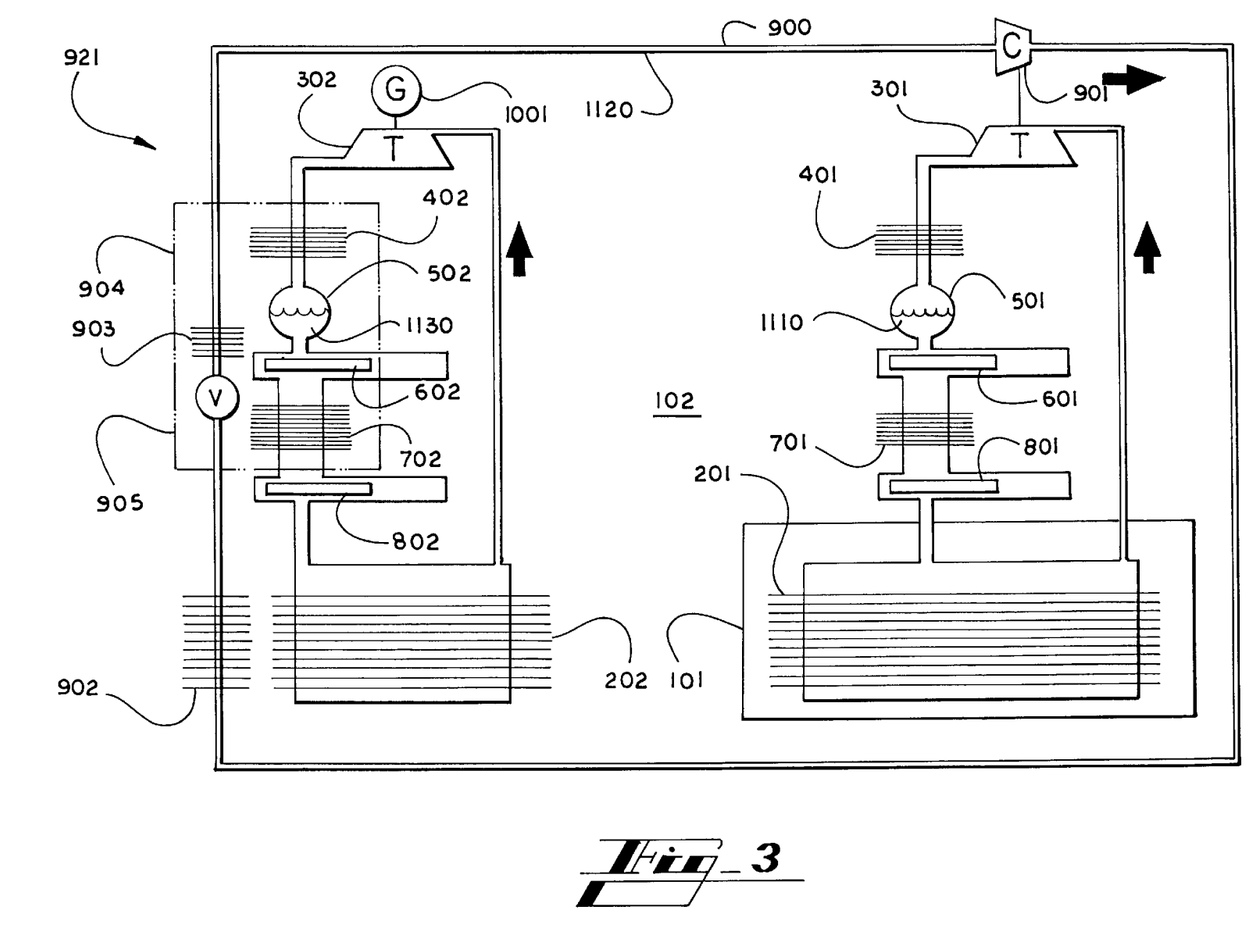
FIG. 3 is a diagram of the third embodiment of the thermal energy conversion and storage system of the present invention.

Referring now in detail to the drawings, in which like numerals indicate like elements throughout the views, FIG. 3 is a block diagram of an energy conversion and storage system 1 of the present invention. The system 1 converts an intermittent thermal energy source into intermittent mechanical energy, and stores the intermittent mechanical energy as a thermal heat sink. This allows the continual conversion of the thermal heat sink to mechanical energy using ambient temperature as the high temperature heat source, and using the stored thermal heat sink as a coolant for a second expansion device. This expansion device also supplies mechanical power, even when the intermittent thermal energy source is temporarily unavailable.

A preferred embodiment of the thermal energy conversion and storage system of the present invention comprises:

a first vaporizer 201 for vaporizing a first thermal fluid 1110 at a high pressure having a vaporizer output supplying high pressure thermal fluid;

a first expansion device 301 in fluid communication with vaporizer output for expanding the high pressure thermal fluid and providing a low pressure thermal fluid at an output of expansion device 301, the first expansion device 301 also supplying useful mechanical power;

a first heat exchanger 401 connected to the output of first expansion device 301 (for cooling and condensing the low pressure thermal fluid) which produces condensed thermal fluid;

a first reservoir 501 connected to the first heat exchanger 401 for receiving condensed thermal fluid and having an outlet controlled by a first valve 601;

a second heat exchanger 701 positioned to accept condensed thermal fluid from the first reservoir 501 by gravity when first valve 601 is opened. The second heat exchanger 701 has at its outlet a second valve 801;

the first vaporizer 201 is positioned and connected to the second valve 801 to accept condensed thermal fluid by gravity from the second heat exchanger 701 when the second valve 801 is opened;

first valve 601 and second valve 701 may be operated to permit intermittent passage of condensed thermal fluid 1110 from the first reservoir 501 to first vaporizer 201 without causing substantial reduction of pressure in first vaporizer 201;

a refrigeration circuit 900 including refrigeration compressor 901, including a pipe circuit and a refrigerant control valve, powered by the first expansion device 301 to remove heat from a third heat exchanger 903 in contact with: a thermal storage medium 905; a second vaporizer 202; a second expansion device 302; a 4th heat exchanger 402; a second reservoir 502; a third valve 602; a 5th heat exchanger 702; a 4th valve 802; a 6th heat exchanger 902; an electric generator 1001 powered by the second expansion device 302; a high temperature thermal energy source 101; and an ambient thermal energy source 102.

Figures 1, 9E:
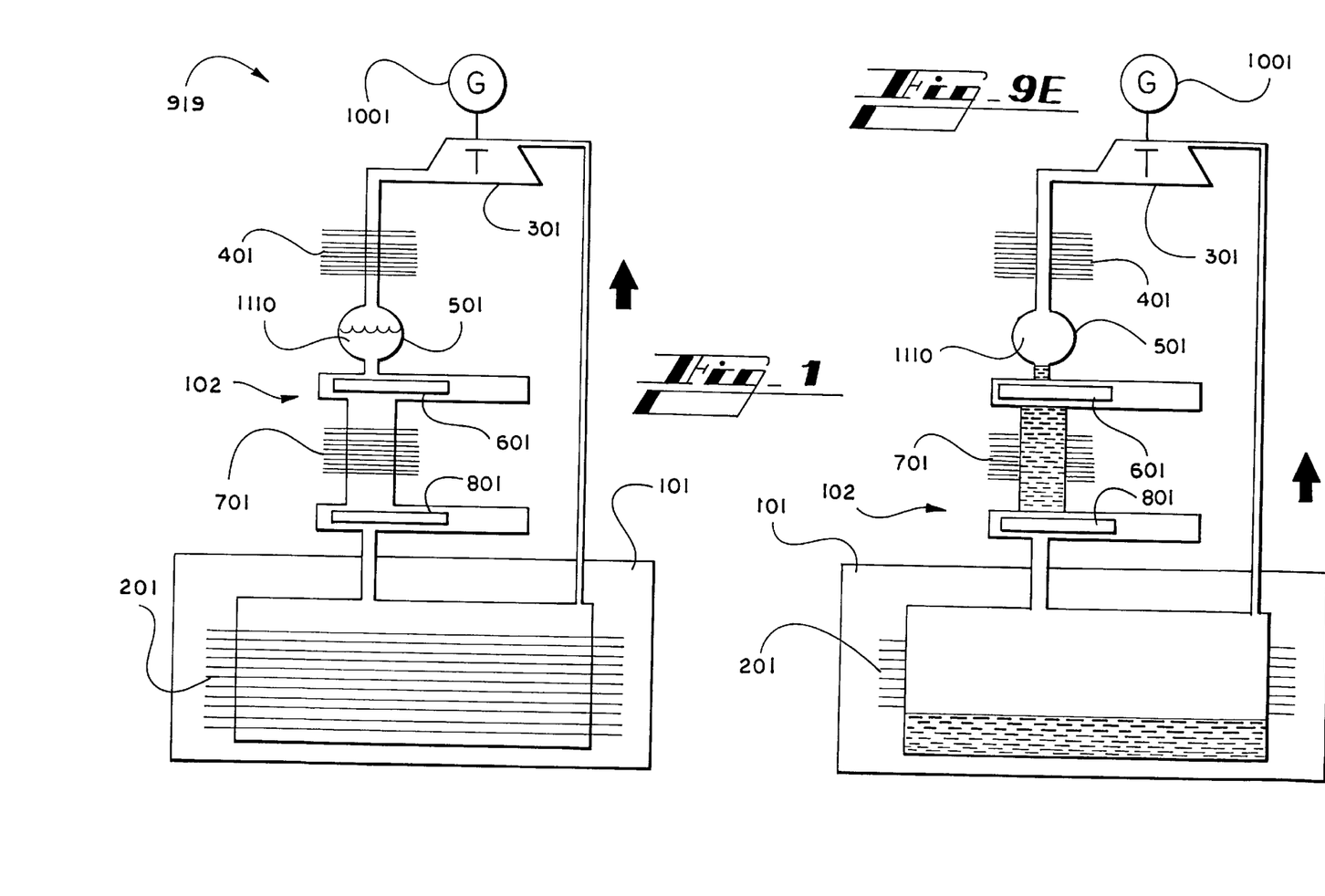
FIG. 1 is a diagram of the first embodiment of the thermal energy conversion and storage system of the present invention.

FIG. 1 shows a diagram of a preferred embodiment. FIG. 1 is heated by any high temperature thermal source, and cooled by any low temperature thermal source. Its expansion device can be any expansion device of the type known to the art that produces useful power, including, but not limited to, a steam engine, a turbine, a piston, and an ejector for producing a refrigeration effect.

Figure 2:
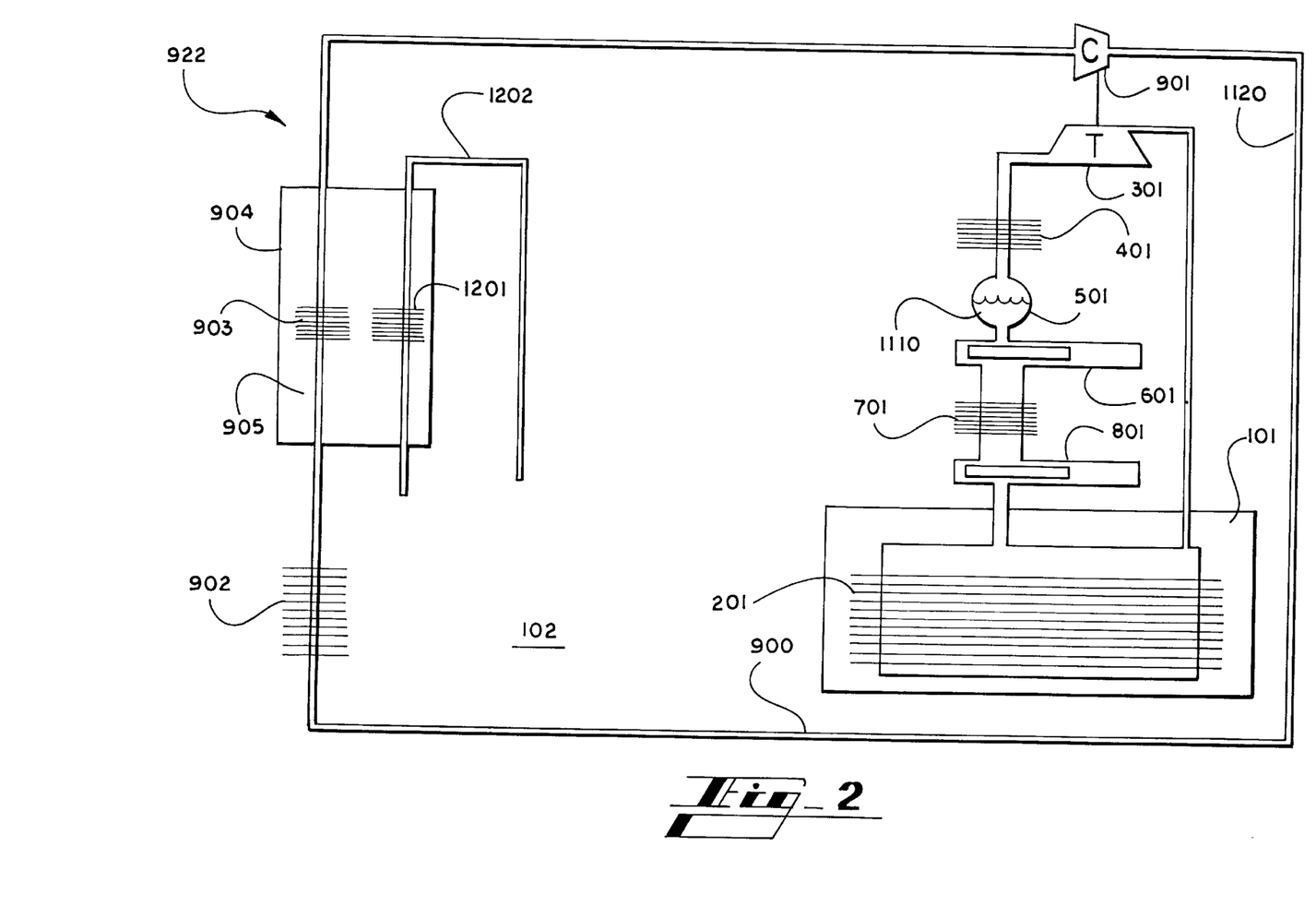
FIG. 2 is a diagram of the second embodiment of the thermal energy conversion and storage system of the present invention.

FIG. 2 is a diagram of the second embodiment of the thermal energy conversion and storage system of the present invention. The second embodiment converts intermittent thermal energy to stored thermal energy in the form of a thermal heat sink. Seventh heat exchanger 1201, and pipe 1202 carries fluid for a chilled fluid air conditioning system. By providing a predetermined size heat sink and insulated heat sink container, pipe 1202 can provide continual air conditioning to a closed space.

FIG. 3 is a block diagram of the third embodiment of the thermal energy conversion and storage system of the present invention. The third embodiment converts intermittent thermal energy to stored thermal energy in the form of a thermal heat sink, and converts the stored thermal sink into mechanical energy.

Figure 4:
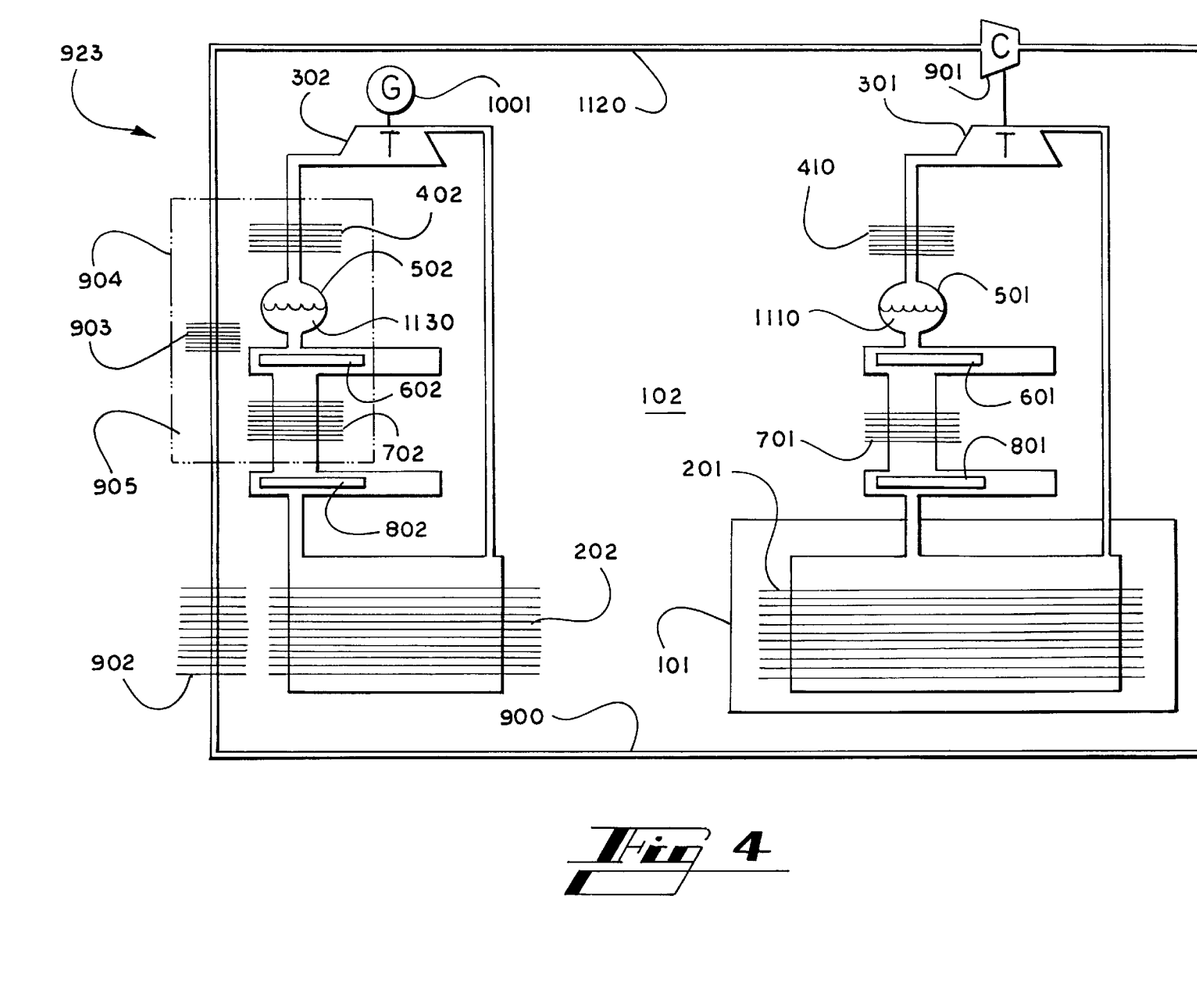
FIG. 4 is a diagram of the fourth embodiment of the thermal energy conversion and storage system of the present invention.

FIG. 4 is a block diagram of the fourth embodiment of the thermal energy conversion and storage system of the present invention. In the fourth embodiment, heat is transferred from the sixth heat exchanger 902 to second vaporizer 202 when compressor 901 is working, thus increasing the efficiency of second expansion device 302.

Figure 5:
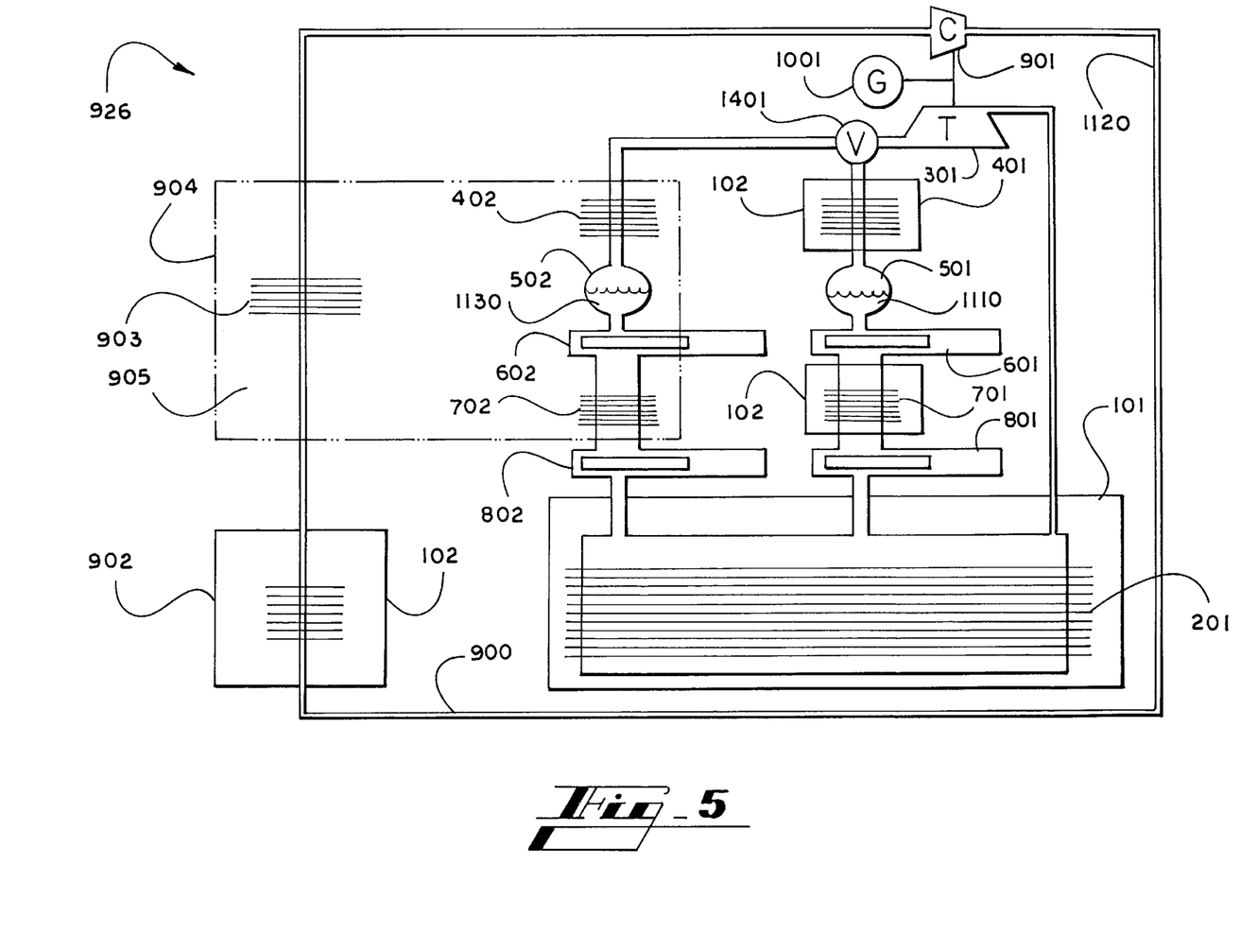
FIG. 5 is a diagram of the fifth embodiment of the thermal energy conversion and storage system of the present invention.

FIG. 5 is a block diagram of the fifth embodiment of the thermal energy conversion and storage system of the present invention. In the fifth embodiment electric generator 1001 and refrigeration means 901 are both powered by first expansion device 301. When a high temperature source is available, such as when the sun is shining onto a solar collector, three-way valve 1401 directs the exhausted refrigerant from first expansion device 301 to first heat exchanger 401. Heat exchangers 401, 701, and 902 are ambient cooled. However, at times when a high temperature thermal energy source is not available, then an ambient heat source is provided to first vaporizer 201, and three-way valve 1401 directs first expansion device's exhaust to 4th heat exchanger 402. Heat sink medium 905 provides the low temperature to drive first expansion device 301, while ambient temperature medium 102 provides the high temperature thermal source.

Figure 6:
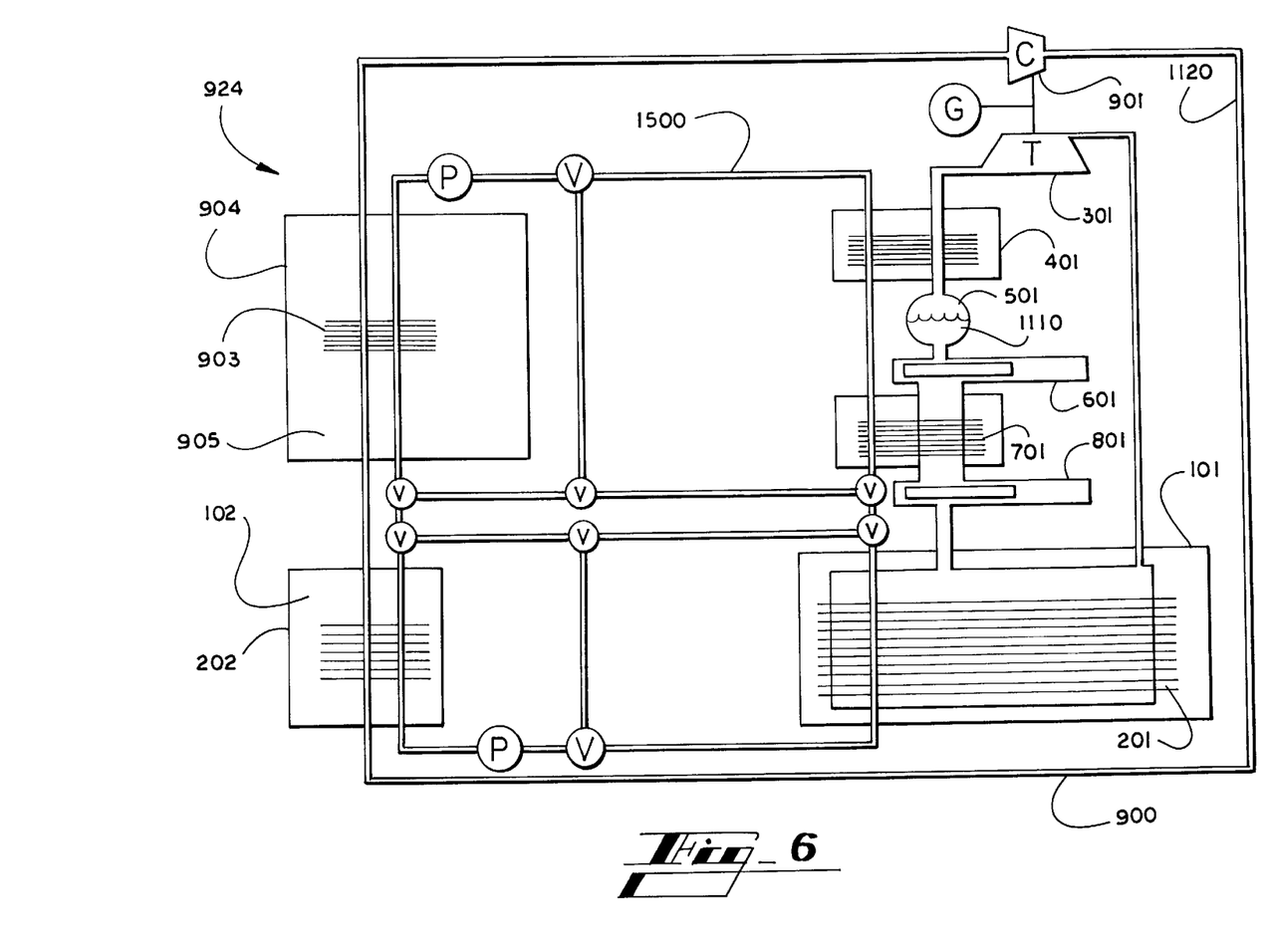
FIG. 6 and FIG. 7 show a diagram of the sixth embodiment of the thermal energy conversion and storage system of the present invention.
Figure 7:
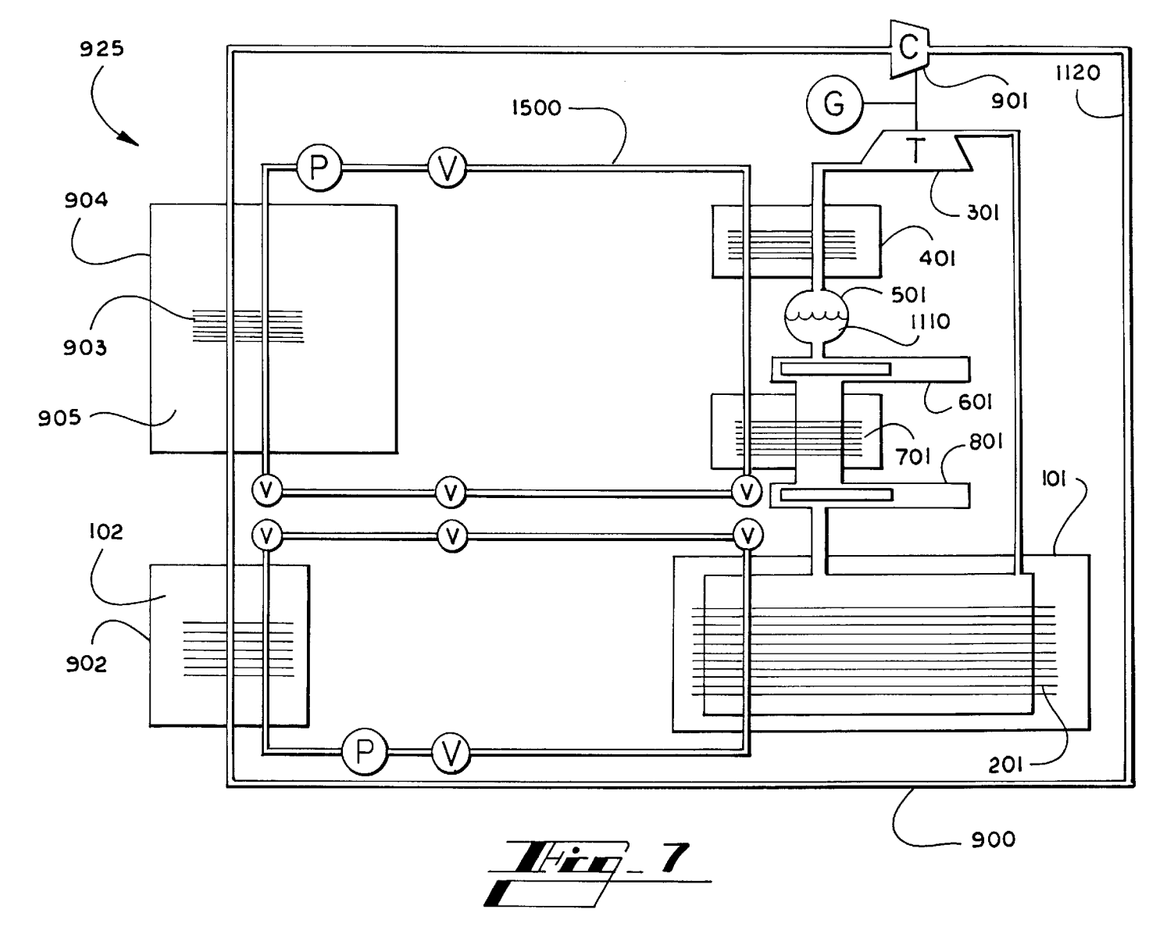

FIG. 6 and FIG. 7 show a block diagram of the sixth embodiment of the thermal energy conversion and storage system of the present invention. FIG. 6 shows pipe, pump, and valve circuit 1500 configured for operation during availability of a high-temperature thermal energy source. The pipes, pump and valves direct a fluid ambient source 102 to first heat exchanger 401, second heat exchanger 701, and a sixth heat exchanger 902. FIG. 7 shows pipe, pump, and valve circuit 1500 configured for operation during unavailability of a high temperature thermal energy source Hatching indicates configuration. In the sixth embodiment, during intermittent lapses in a high temperature thermal energy source, such as the sun, stored thermal heat sink medium 905 provides the low temperature source, and ambient medium 102 provides the heat to drive first expansion device 301.

Figure 8:
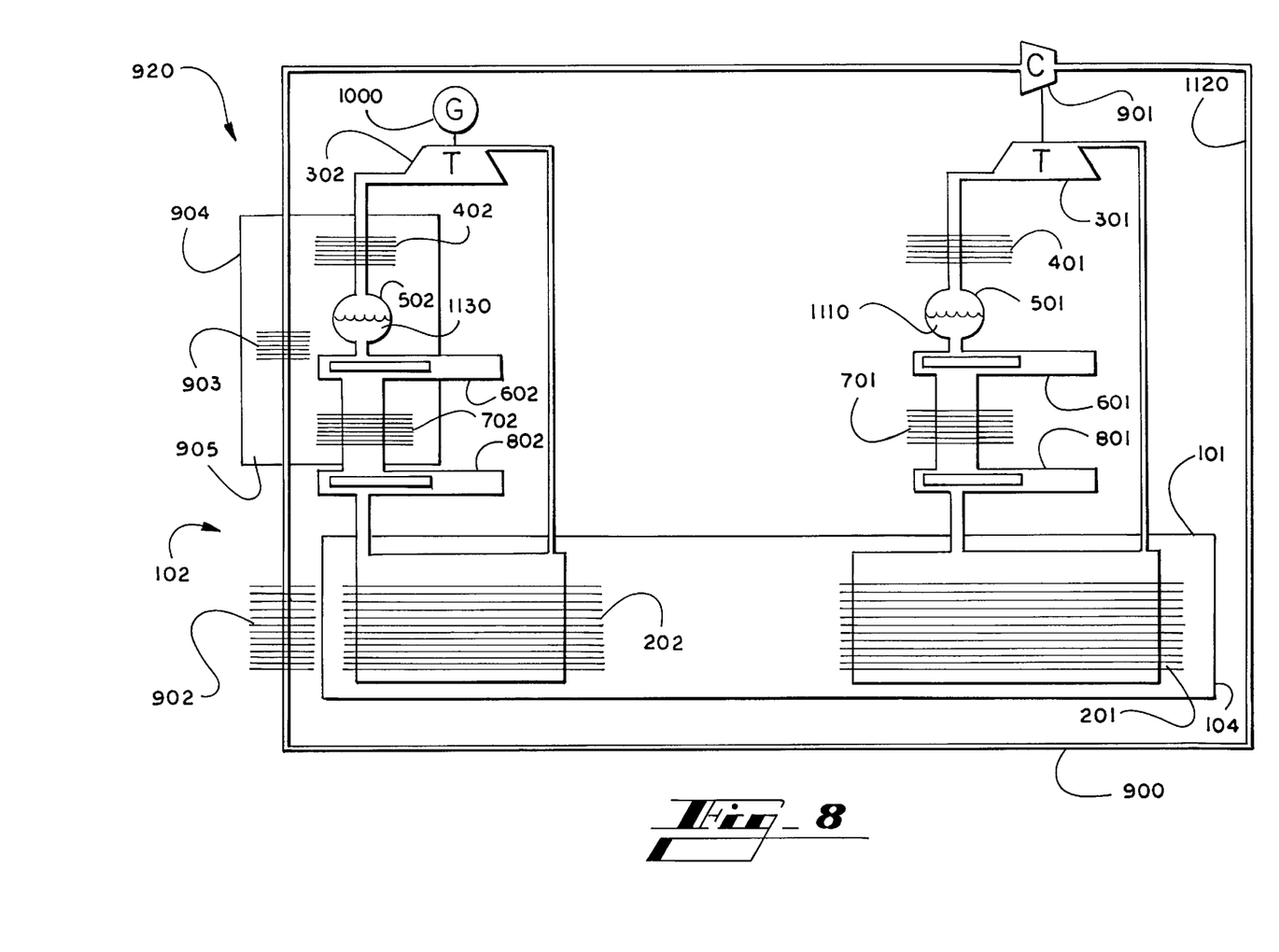
FIG. 8 is a diagram of the seventh embodiment of the thermal energy conversion and storage system of the present invention.

FIG. 8 is a block diagram of the seventh embodiment of the thermal energy conversion and storage system of the present invention. In the seventh embodiment, high temperature heat source 101 provides thermal energy to both vaporizer 201 and vaporizer 202. High temperature heat source 101 is contained and stored in insulated storage tank 104. Storage tank 104 is large enough to store a predetermined quantity of thermal energy to continually provide thermal energy to the first expansion device and the second expansion device.

The eighth embodiment is a unit whose second expansion device is heated by ambient thermal energy, and whose intermittent high-demand thermal energy requirements are augmented with stored thermal energy.

FIGS. 9 *a*) through 9 *l*) show sequentially the operation of the motorless pump in the thermal energy conversion and storage system of the present invention.

Referring to first embodiment in the sequential operation of the motorless compressor, in FIGS. 9*a*–9*l*, first refrigerant 1110 of first vaporizer 201, in contact with high temperature thermal energy source 101, is heated and gaseous refrigerant proceeds to first expansion device 301 and through first heat exchanger 401, 9*b*) and then collects as a liquid in liquid reservoir 501.

Figures 9A, 9B:
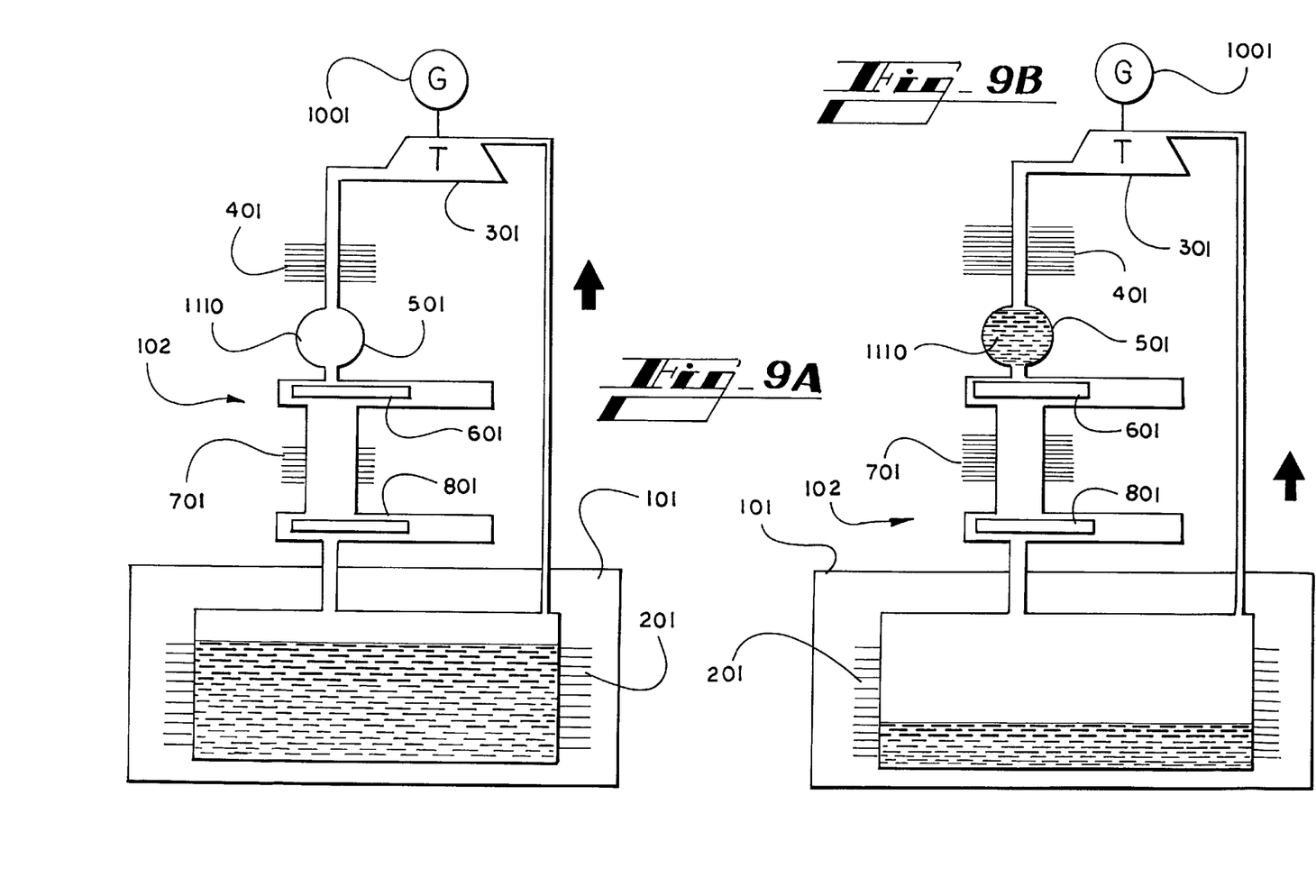
Figures 9C, 9D:
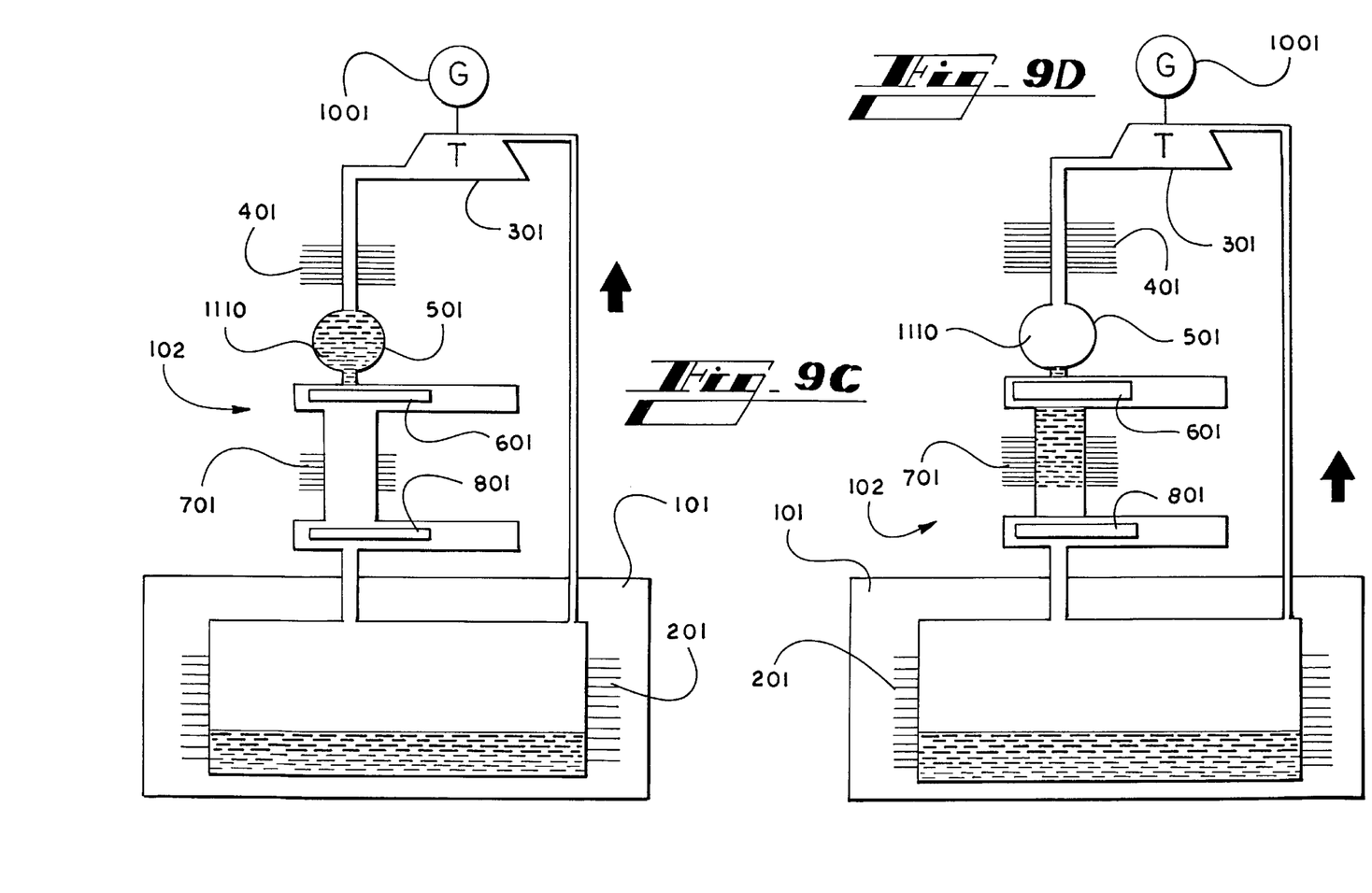

9*c*) first valve 601 opens

9*d*) allowing liquid refrigerant 1110 to enter second heat exchanger 701.

9*e*) first valve 601 closes.

Figures 9F, 9G:
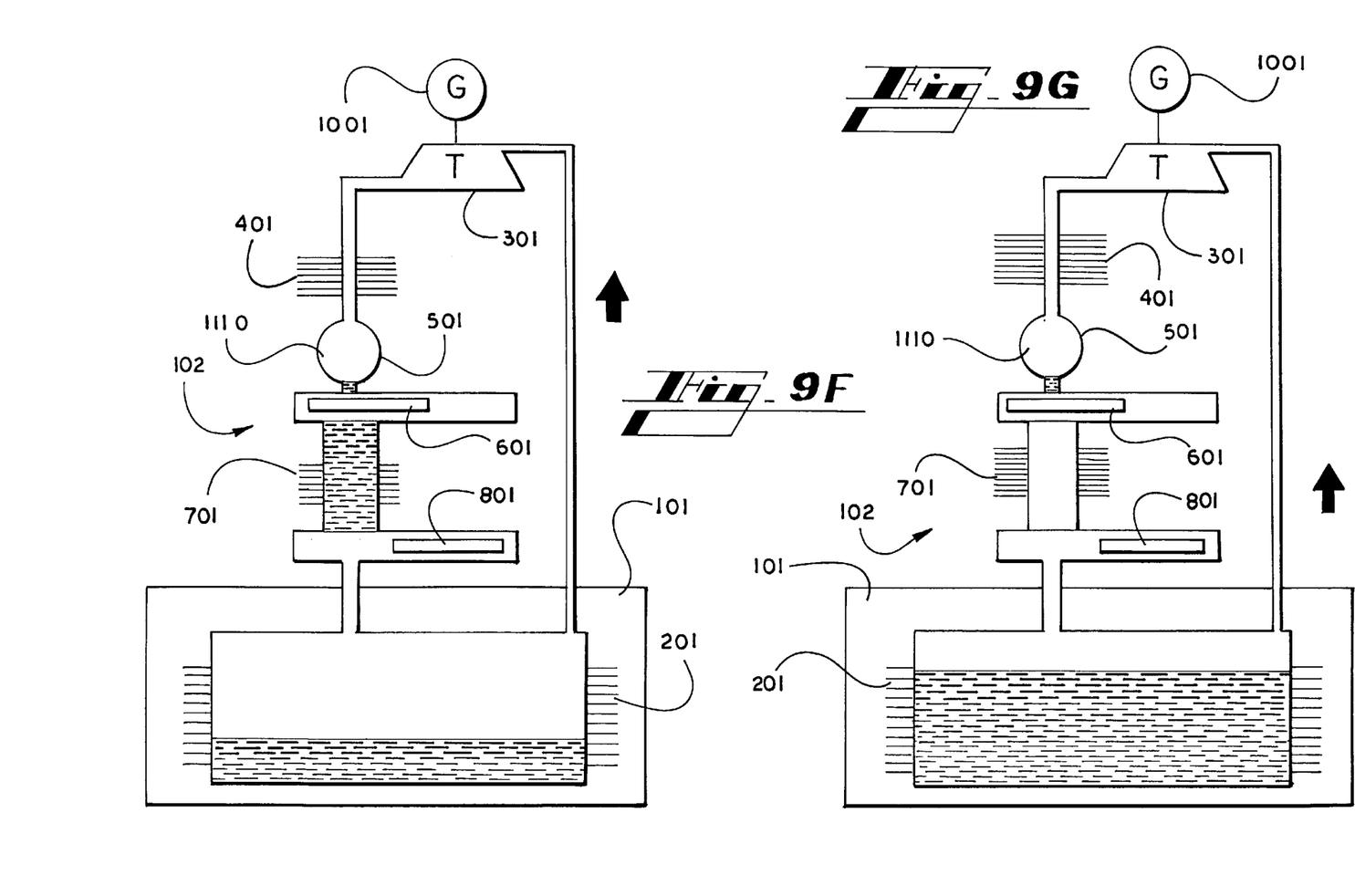

9*f*) second valve 801 opens,

9*g*) allowing liquid refrigerant 1110 to fall by gravity into high pressure vaporizer 201. Liquid refrigerant in second heat exchanger 701 is displaced by high pressure vaporous refrigerant.

Figures 9H, 9I:
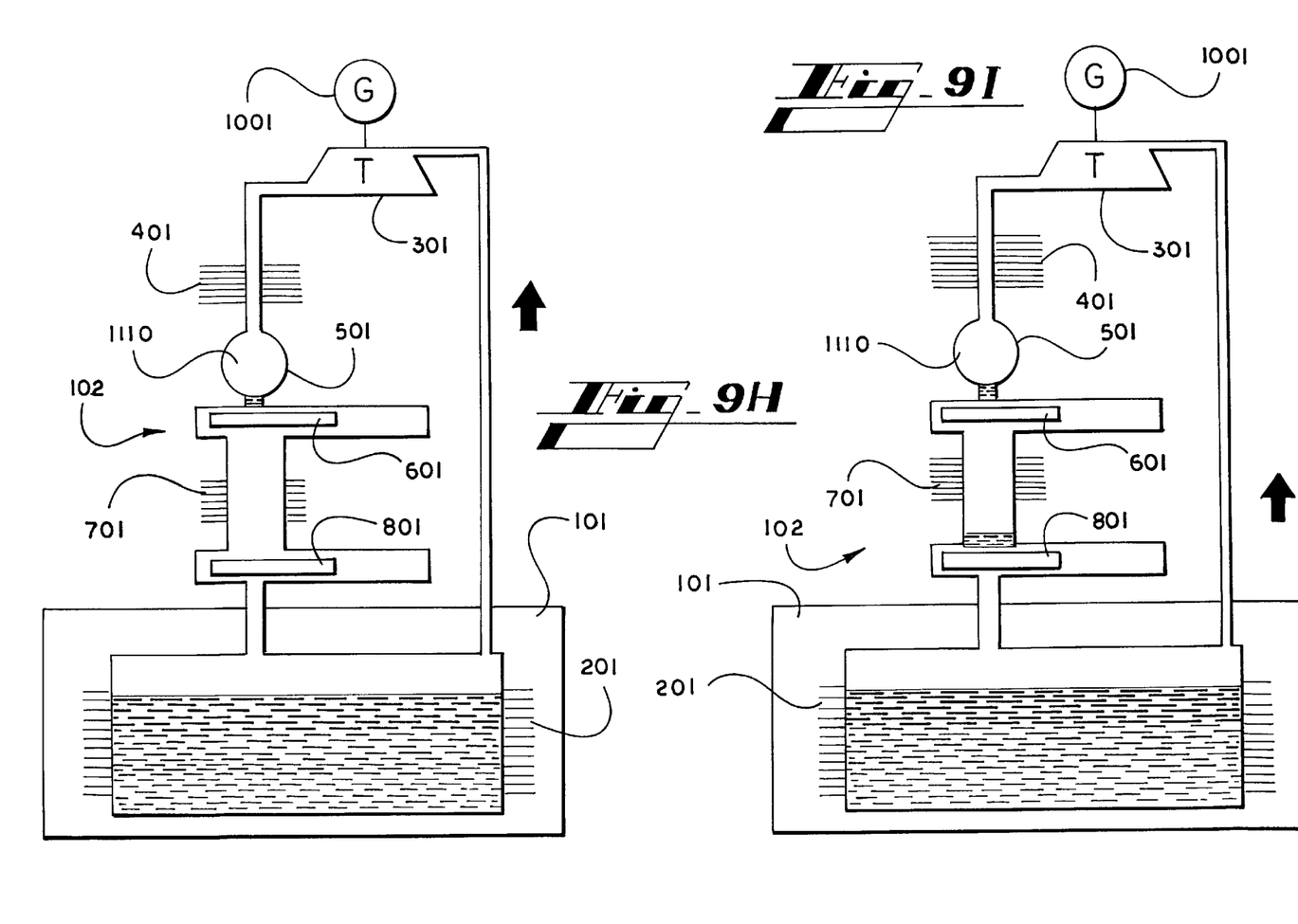

9*h*) second valve 801 closes, trapping gaseous high pressure hot refrigerant in second heat exchanger 701.

9*i*) Gaseous, high pressure, hot refrigerant is cooled in second heat exchanger 701, and condenses into a low pressure, cool liquid refrigerant.

Figures 9J, 9K:
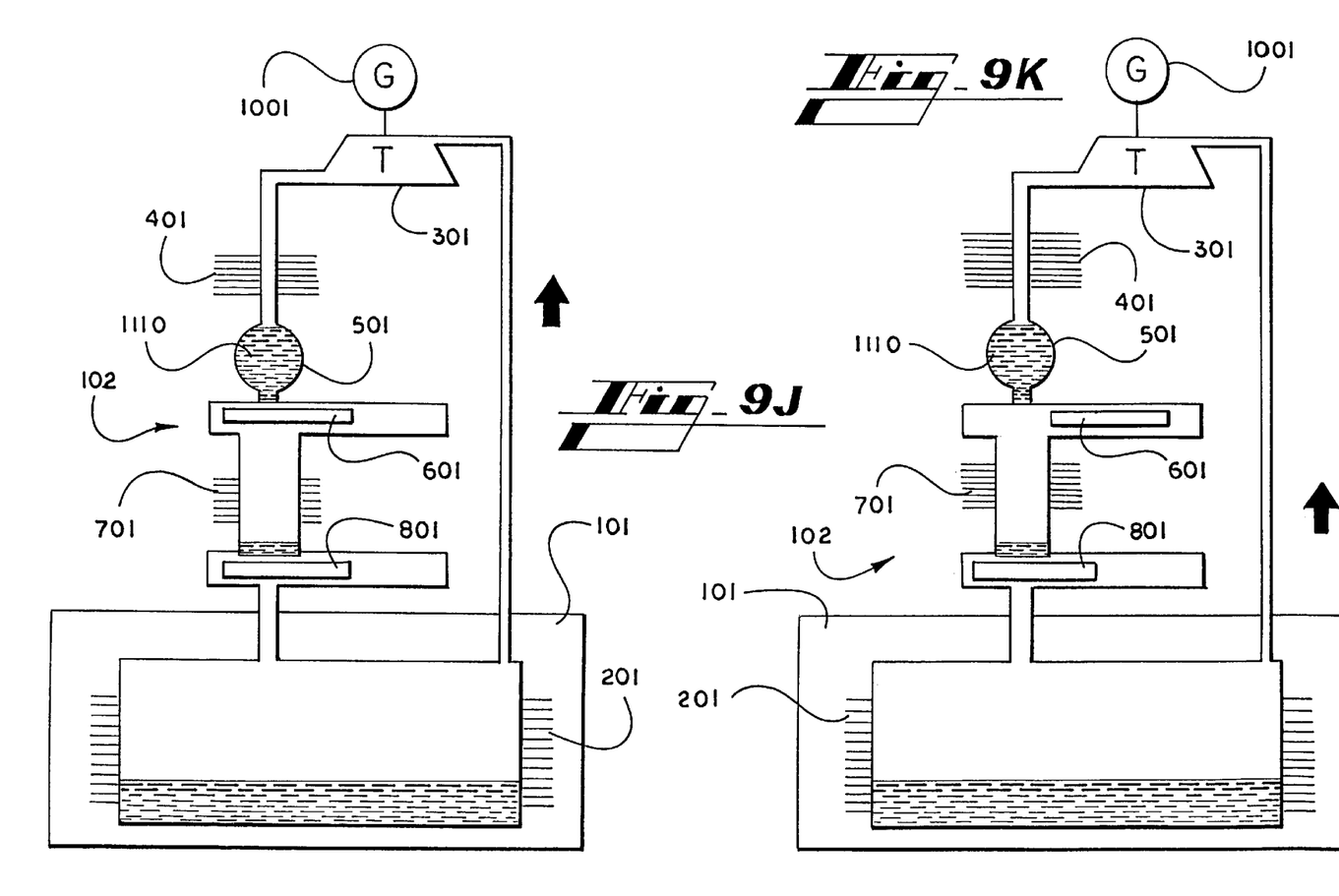

9*j*) High temperature thermal energy source 101, continually heats refrigerant 1110 in vaporizer 201. Refrigerant vapor 1110 powers expansion device 301, and spent vapor condenses and collects as cool liquid in reservoir 501.

9*k*) first valve 601 opens,

9*l*) allowing cool liquid refrigerant 1110 to fall into second heat exchanger 701. This stage identical to stage 9*d*). The cycle continues with stage 9*e*.

FIG. 10 is a block diagram of the eighth embodiment of the thermal energy conversion and storage system of the present invention. The eighth embodiment is a unit whose second expansion device is heated by ambient thermal energy, but whose intermittent high demand thermal energy requirements are augmented with stored thermal energy.

In a preferred embodiment of the present invention when a high temperature thermal source is available, a first thermal fluid 1110 is vaporized by a high temperature thermal source 101 to provide a high pressure thermal fluid in a first vaporizer 201, expanding the first thermal fluid 1110 to produce useful mechanical power in first expansion device 301 and a low pressure thermal fluid (Step 1). The first thermal fluid 1110 is cooled to ambient and condensed in a first heat exchanger 401 to provide a condensed thermal fluid (Step 2). The condensed thermal fluid is passed and accumulated into a first reservoir 501 providing accumulated condensed thermal fluid (Step 3). The accumulated condensed thermal fluid is intermittently passed, using gravity, through a first valve 601 to a second heat exchanger 701 by opening the first valve 601 (Step 4). The first valve 601 is then closed (Step 5). The accumulated condensed thermal fluid in second heat exchanger 701 is passed through a second valve 801, using gravity, to the first vaporizer 201 by opening the second valve 801 (Step 6). The second valve 801 is then closed (Step 7). The second heat exchanger 701 is cooled to ambient, removing the heat of vaporization from the high pressure thermal fluid in the second heat exchanger 701 (Step 8).

A refrigeration means 900 for removing heat, including second thermal fluid 1120, and a pipe circuit, is powered by the first expansion device 301, and removes heat from a third heat exchanger 903 in contact with a thermal storage medium 905, and releases heat from a sixth heat exchanger 902 to ambient 102 or to second vaporizer 202, thus producing an artificial low temperature thermal storage media 905 in a thermally insulated storage container 904 (Step 9).

Steps 1, 2 and 3 and 9 can be continual and concurrent. Steps 4, 5, 6, 7, 8 are consecutively repeatable, and operable concurrent with steps 1, 2, 3 and 9. Steps 1–9 are operable when a high temperature thermal source is available.

A third thermal fluid 1130 is vaporized by an ambient temperature thermal source 102 to provide a high pressure thermal fluid in a second vaporizer 202, expanding the third thermal fluid. 1130 to produce useful mechanical power in a second expansion device 302 and a low pressure thermal fluid (Step 10).

The third thermal fluid 1130 is cooled by the low temperature thermal storage media 905 and condensed in a fourth heat exchanger 402 to provide a condensed thermal fluid (Step 11). The condensed thermal fluid is passed and accumulated into a second reservoir 502 providing accumulated condensed thermal fluid (Step 12). The accumulated condensed thermal fluid is intermittently passed, using gravity, through a third valve 602 to a fifth heat exchanger 702 by opening the third valve 602 (Step 13). The third valve 602 is then closed (Step 14).

A fourth valve 802 is opened and accumulated condensed thermal fluid in fifth heat exchanger 702 is passed, using gravity, through the fourth valve 802 to the second vaporizer 202 (Step 15). The fourth valve 802 is closed (Step 16). The fifth heat exchanger 702 is cooled by the low temperature thermal storage media 905, removing the heat of vaporization from the high pressure thermal fluid in the fifth heat exchanger 702 (Step 17).

Steps 10, 11 and 12 are continual and concurrent. Steps 13, 14, 15, 16, and 17 are consecutively repeatable, and operable, concurrent with steps 10, 11, and 12. Steps 10–17 are operable when the low temperature thermal heat sink 905 is available.

Other Embodiments

In one embodiment of the present invention, the thermal energy conversion and storage system of the present invention includes the following elements. One element is a vaporizer for vaporizing a thermal fluid at a high pressure having a vaporizer output supplying high pressure thermal fluid. Another element is an expansion device in fluid communication with the vaporizer output for expanding the high pressure thermal fluid and providing a low pressure thermal fluid at an output of the expansion device. This expansion device can also supply useful mechanical power.

Further elements of a preferred embodiment include a first heat exchanger connected to the output of the expansion device for cooling and condensing the low pressure thermal fluid. A condensed thermal fluid is produced. A reservoir is connected to the first heat exchanger and receives the condensed thermal fluid. The reservoir has an outlet controlled by a first valve. There is a second heat exchanger that is positioned to accept the condensed thermal fluid from the reservoir. The fluid uses gravity to flow when the first valve is opened. The second heat exchanger has a second valve at its outlet.

This embodiment further includes a vaporizer that is connected to the second valve to accept the condensed thermal fluid, which flows by gravity from the second heat exchanger when the second valve is opened. The first and second valves may be operated to permit intermittent passage of the condensed thermal fluid from the reservoir to the vaporizer without causing substantial reduction of the pressure in the vaporizer.

Particularly, in the first embodiment, the solar collection circuit includes a vaporizer, an expansion device, a first heat exchanger, a reservoir, a first valve, a second heat exchanger; and a second valve. A method of conversion of energy in the first embodiment comprises the steps of a thermal fluid which is vaporized to provide a high pressure thermal fluid in a vaporizer, expanding the thermal fluid to produce useful mechanical power and a low pressure thermal fluid. The thermal fluid is cooled and condensed in a heat exchanger to provide a condensed thermal fluid. The condensed thermal fluid is passed and accumulated into a reservoir providing accumulated condensed thermal fluid.

The accumulated condensed thermal fluid is intermittently passed, using gravity, through a first valve to a second heat exchanger by opening the first valve. The first valve is closed. The accumulated condensed thermal fluid in second heat exchanger is passed through a second valve, using gravity, to the vaporizer by opening the second valve. The second valve is closed. The second heat exchanger is cooled, removing the heat of vaporization from the high pressure thermal fluid in the second heat exchanger.

The steps of vaporizing the fluid, cooling and condensing the fluid and passing the fluid to a reservoir can be continual and concurrent. The rest of the steps are consecutively repeatable, and operable concurrent with vaporizing, condensing and passing of the fluid.

In a third embodiment of the present invention, the thermal energy conversion and storage system of the present invention includes, in addition to the elements of the first embodiment, a refrigeration circuit to cool a liquid thermal storage media, and at least one additional of the apparatus of first embodiment.

Particularly, in the third embodiment of the present invention, the thermal energy conversion and storage system of the present invention includes a first vaporizer, a first expansion device, a first heat exchanger, a first reservoir, and a first valve The elements of the third embodiment further include a second heat exchanger, a second valve, and a refrigeration means including a pipe circuit that is powered by the first expansion device to remove heat from a third heat exchanger in contact with a thermal storage medium contained by an insulated storage container. Additionally elements included are a second vaporizer, a second expansion device, a fourth heat exchanger, a second reservoir, a third valve, a fifth heat generator powered by the second expansion device, a high temperature thermal source and an ambient thermal source.

Using this third embodiment, when a high temperature thermal source is available, a first thermal fluid is vaporized by a high temperature thermal source to provide a high pressure thermal fluid in a first vaporizer. The first thermal fluid is expanded to produce useful mechanical power in a first expansion device and a low pressure thermal fluid results from the expansion.

The first thermal fluid is then cooled to ambient temperature and is condensed in a first heat exchanger to provide a condensed thermal fluid. The condensed thermal fluid is then passed and accumulated into a first reservoir providing accumulated condensed thermal fluid. The accumulated condensed thermal fluid is intermittently passed, using gravity, through a first valve to a second heat exchanger by opening the first valve. The first valve is then closed.

The accumulated condensed thermal fluid in second heat exchanger is passed through a second valve, using gravity, to the first vaporizer by opening the second valve. The second valve is then closed. The second heat exchanger is cooled to ambient temperature, removing the heat of vaporization from the high pressure thermal fluid in the second heat exchanger.

A refrigeration means, including a pipe circuit, a refrigerant, and refrigerant is powered by the first expansion device, to remove heat from a third heat exchanger in contact with a thermal storage medium, and releases heat from a 6th heat exchanger to ambient or to second vaporizer, thus producing an artificial low temperature thermal storage media in a thermally insulated storage container.

The steps of vaporization, condensation and movement of the fluid into the first reservoir, along with the production of the low temperature thermal storage media, are continual and concurrent in the operation of the apparatus. The other steps are repeatable in a logical order and function with the fluid treatment above.

A third thermal fluid is vaporized by an ambient temperature thermal source to provide a high pressure thermal fluid in a second vaporizer, expanding the second thermal fluid to produce useful mechanical power in second expansion device and a low pressure thermal fluid. The third thermal fluid is cooled by the low temperature thermal storage media and condensed in a fourth heat exchanger to provide a condensed thermal fluid.

The condensed thermal fluid is passed and accumulated into a second reservoir providing accumulated condensed thermal fluid. The accumulated condensed thermal fluid is intermittently passed, using gravity, through a third valve to a fifth heat exchanger by opening the third valve. The third valve is then closed.

A fourth valve is opened and the accumulated condensed thermal fluid in the fifth heat exchanger is passed, using gravity, through the fourth valve to the second vaporizer. The fourth valve is then closed. The fifth heat exchanger is cooled by the low temperature thermal storage media, removing the heat of vaporization from the high pressure thermal fluid in the fifth heat exchanger.

The vaporization, condensation and movement of the third fluid into the second reservoir are continuous and concurrent with other steps of the method. The steps that follow are consecutively repeatable, and operable concurrent with the treatment of the third fluid described above. The steps using the third thermal fluid are operable when a low temperature thermal heat sink is available.

Therefore, in the third embodiment of the present invention, the thermal energy conversion and storage system of the present invention can rely on intermittent solar energy to produce the stored low temperature thermal heat sink. An ambient thermal source provides thermal energy to the second expansion device, and the stored heat sink absorbs the spent thermal energy of the second expansion device.

Additionally, the energy conversion and storage system of the present invention, in each embodiment, may optionally include: a solar collector and heat delivery system of a kind well known to the art to provide intermittent thermal energy to at least one of the vaporizer. Further included elements are an ambient temperature thermal energy delivery system of a kind well known to the art, an ambient temperature thermal energy cooling system of a kind well known to the art, and a computerized monitoring and actuating system including solenoid valves. Other elements included are monitoring means to observe, control and optimize fluid flow, energy distribution, expansion device speed and expansion device power, and other areas that can be automated. The energy conversion and storage system of the present invention can also be operated manually with manual valves.

What is claimed is:

1. A thermal power system comprising:

a) a vaporizer for vaporizing a thermal fluid at a high pressure having a vaporizer output supplying high pressure thermal fluid, b) an expansion device in fluid communication with the vaporizer output for expanding the high pressure thermal fluid and providing a low pressure thermal fluid at an output of the expansion device, the expansion device also supplying useful mechanical power, c) a first heat exchanger connected to the output of the expansion device for cooling and condensing the low pressure thermal fluid, producing condensed thermal fluid, d) a reservoir connected to the first heat exchanger for receiving the condensed thermal fluid having an outlet controlled by a first valve, e) a second heat exchanger positioned to accept the condensed thermal fluid from the reservoir by gravity when the first valve is opened; the second heat exchanger including at its outlet a second valve, f) the vaporizer positioned and connected to the second valve to accept the condensed thermal fluid by gravity from the second heat exchanger when the second valve is opened, whereby the first and second valves may be operated to permit intermittent passage of the condensed thermal fluid from the reservoir to the vaporizer without causing substantial reduction of the pressure in the vaporizer.

2. A method of operating a power plant comprising the steps of:

a) vaporizing a thermal fluid to provide a high pressure thermal fluid in a vaporizer, b) expanding the thermal fluid to produce useful mechanical power and a low pressure thermal fluid, c) cooling and condensing the thermal fluid in a heat exchanger to provide a condensed thermal fluid, d) passing and accumulating the condensed thermal fluid into a reservoir providing accumulated condensed thermal fluid, e) intermittently passing, using gravity, the accumulated condensed thermal fluid through a first valve to a second heat exchanger by opening the first valve, f) closing the first valve, g) passing the accumulated condensed thermal fluid from the second heat exchanger through a second valve, using gravity, to the vaporizer and closing the second valve.

* * * * *